US007149287B1

(12) United States Patent
Burger et al.

(10) Patent No.: US 7,149,287 B1
(45) Date of Patent: Dec. 12, 2006

(54) UNIVERSAL VOICE BROWSER FRAMEWORK

(75) Inventors: Eric W. Burger, Amherst, NH (US); John J. Van Dyke, Concord, MA (US)

(73) Assignee: Snowshore Networks, Inc., Chelmsford, MA (US)

( * ) Notice: Subject to any disclaimer, the term of this patent is extended or adjusted under 35 U.S.C. 154(b) by 296 days.

(21) Appl. No.: 10/346,549

(22) Filed: Jan. 17, 2003

Related U.S. Application Data

(60) Provisional application No. 60/349,836, filed on Jan. 17, 2002.

(51) Int. Cl.
*H04M 1/64* (2006.01)
(52) U.S. Cl. .............. 379/88.17; 370/401; 379/202.01; 704/270
(58) Field of Classification Search ............ 379/88.17, 379/202.01; 709/217; 704/270; 370/352, 370/353, 354, 355, 356, 259, 401; 707/10
See application file for complete search history.

(56) References Cited

U.S. PATENT DOCUMENTS

| 4,785,408 | A | 11/1988 | Britton et al. ............ 364/513.5 |
|---|---|---|---|
| 5,621,891 | A | 4/1997 | Rühl et al. ................ 395/2.79 |
| 6,035,275 | A | 3/2000 | Bröde et al. ............... 704/275 |
| 6,240,448 | B1 | 5/2001 | Imielinski et al. ......... 709/218 |
| 6,269,336 | B1 | 7/2001 | Ladd et al. ................ 704/270 |
| 6,829,334 | B1 * | 12/2004 | Zirngibl et al. .......... 379/88.17 |
| 6,888,828 | B1 * | 5/2005 | Partanen et al. ........... 370/389 |
| 6,922,411 | B1 * | 7/2005 | Taylor ....................... 370/401 |
| 2002/0146108 | A1 * | 10/2002 | Weissman et al. ..... 379/221.06 |
| 2003/0081744 | A1 * | 5/2003 | Gurfein et al. ............ 379/93.13 |
| 2003/0091175 | A1 * | 5/2003 | Celi et al. ................ 379/202.01 |
| 2003/0187992 | A1 * | 10/2003 | Steenfeldt et al. .......... 709/227 |
| 2004/0205614 | A1 * | 10/2004 | Keswa ....................... 715/523 |

FOREIGN PATENT DOCUMENTS

| WO | WO 00/05638 | 2/2000 |
|---|---|---|
| WO | WO 00/05643 | 2/2000 |
| WO | WO 00/05708 | 2/2000 |
| WO | WO 00/17854 | 3/2000 |

OTHER PUBLICATIONS

W3C, "Call Control Requirements in a Voice Browser Framework", W3C Working Draft, pp. 1-10, http://www.w3.org/TR/2001WD-call-control-reqs-20010413/, (Apr. 13, 2001).
John Paul Ashenfelter, "Voice on Your Web Site: Now You're Talking", O'Reilly Network, pp. 1-5, http://www.oreillynet.com/pub/a/network/2001/11/28/voxeo.html, (Nov. 28, 2000).

* cited by examiner

*Primary Examiner*—Fan Tsang
*Assistant Examiner*—Olisa Anwah
(74) *Attorney, Agent, or Firm*—Weingarten, Schurgin, Gagnebin & Lebovici LLP (57) ABSTRACT

A system and method for providing voice communications over a network, including a media server having a voice rendering platform for supporting voice-based user interactions. The voice rendering platform provides prompting, information collection and validation, and audio recording and transcoding. A separate application server is responsible for performing call control actions. During a user dialog, control is passed to the media server for rendering and receiving data, and passed back to the application server for call control actions. The media server includes a script execution environment for rendering the voice components of the user dialogs. The application server is an execution platform for applications written in a procedural programming language. Voice communications over a network are provided without combining call control and voice rendering functionality into a single, script execution platform.

25 Claims, 10 Drawing Sheets

UNIVERSAL VOICE BROWSER FRAMEWORK

CROSS REFERENCE TO RELATED APPLICATIONS

This application claims priority under 35 U.S.C. §119(e) to provisional patent application Ser. No. 60/349,836 filed Jan. 17, 2002, and entitled "Universal Voice Browser Framework".

STATEMENT REGARDING FEDERALLY SPONSORED RESEARCH OR DEVELOPMENT

N/A

BACKGROUND OF THE INVENTION

The present invention relates generally to communication systems, and more specifically to a system and method for providing voice communications over a global communication network ("Web").

A number of existing systems have been designed to provide voice communications over the Web. Recently, what has been referred to as a Voice Browser platform has been used for execution of VoiceXML (Voice extensible Markup Language) scripts in connection with various specific types of voice enabled applications executing on an application server. In a typical telephonic user interaction using such an existing architecture, a VoiceXML script executes on the Voice Browser to support a dialog with a user. During the dialog, various voice prompts may be provided, and the user provides response data that is captured and stored. In a common scenario, when the user has entered sufficient data to complete a form, a SUBMIT command is executed through the Voice Browser, causing an HTTP (HyperText Transport Protocol) transaction to occur, often resulting in another VoiceXML script being selected for execution.

The VoiceXML language processed by the Voice Browser includes many commands ("tags") for supporting a user dialog. These include commands for rendering of aural data, for example by providing recorded and/or synthesized voice prompts, as well as commands for accepting different types of input data, for example by receiving and processing voice and DTMF (DualTone Multi-Frequency) data. VoiceXML also includes a number of telephony commands relating to call control actions. Call control refers to the ability of executing scripts to control a connection with the user. Call control actions performed through VoiceXML commands executed in the Voice Browser include various types of call transfers. Call transfer actions may include simply transferring the user to another destination, transferring the user to another destination and dropping out of a call if the transfer is successful, and/or transferring the user but staying in the call, either to retrieve the user at the end of their interaction with the remote destination, or to monitor the call for events such as the user speaking a keyword or pressing a special key.

In the existing Voice Browser architecture, both call control and voice rendering functionality are provided through execution of VoiceXML scripts within the Voice Browser platform. The VoiceXML scripting language, like similar scripting languages such as HTML (HyperText Markup Language), is well suited to rendering data. As is generally known, HTML is designed for development of scripts that are primarily used to render visual data. VoiceXML is intended for development of scripts relating to voice-driven interactions. Accordingly, many of the commands in VoiceXML are designed to support rendering and reception of voice dialog data. However, the procedural logic needed for many call control actions is not well supported using VoiceXML. For example, the syntax of the <if> command is convoluted in VoiceXML, and none of the standard structured programming constructs, such as "for", "while", and "until" are provided. In particular, supporting the VoiceXML <transfer> command to transfer a user to a new destination, such as a remote call center, is problematic. The various state machines associated with the different call signaling mechanisms that must be supported in this regard are difficult to implement using VoiceXML. Moreover, handling error cases in VoiceXML script for such call control state machines is awkward and excessively complex.

For these reasons and others, it would be desirable to have a system for providing voice communications over a network that does not combine call control and voice rendering functionality within VoiceXML scripts executed in a Voice Browser. The system should advantageously enable the use of procedural programming constructs for supporting call control actions, while efficiently processing VoiceXML for dialog rendering purposes.

BRIEF SUMMARY OF THE INVENTION

In accordance with the present invention, a system and method for providing voice communications over a network are disclosed. In the disclosed system, a media server provides a voice rendering platform for supporting voice-based user interactions. In this regard, the voice rendering platform of the disclosed media server provides voice rendering functionality such as prompting, information collection and validation, audio recording and transcoding.

Application execution in the disclosed system is performed in an application server separate from the media server. The application server is responsible for performing call control actions. During a user dialog, control is passed to the media server for rendering and receiving data, and passed back to the application server for call control actions. Accordingly, the media server includes a script execution environment for rendering the voice components of user dialogs, whereas the application server is an execution platform for applications written in a procedural programming language.

In this way, the disclosed system provides voice communications over a network without combining call control and voice rendering functionality into a single platform. The disclosed system advantageously enables the use of procedural programming constructs for dealing with call control actions, while processing VoiceXML for dialog rendering purposes. The disclosed system eliminates the need to perform call transfer actions in a VoiceXML execution environment, using the VoiceXML <transfer> command.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

U.S. provisional patent application Ser. No. 60/349,836 filed Jan. 17, 2002, and entitled "Universal Voice Browser Framework" is hereby incorporated by reference.

Figure 1:
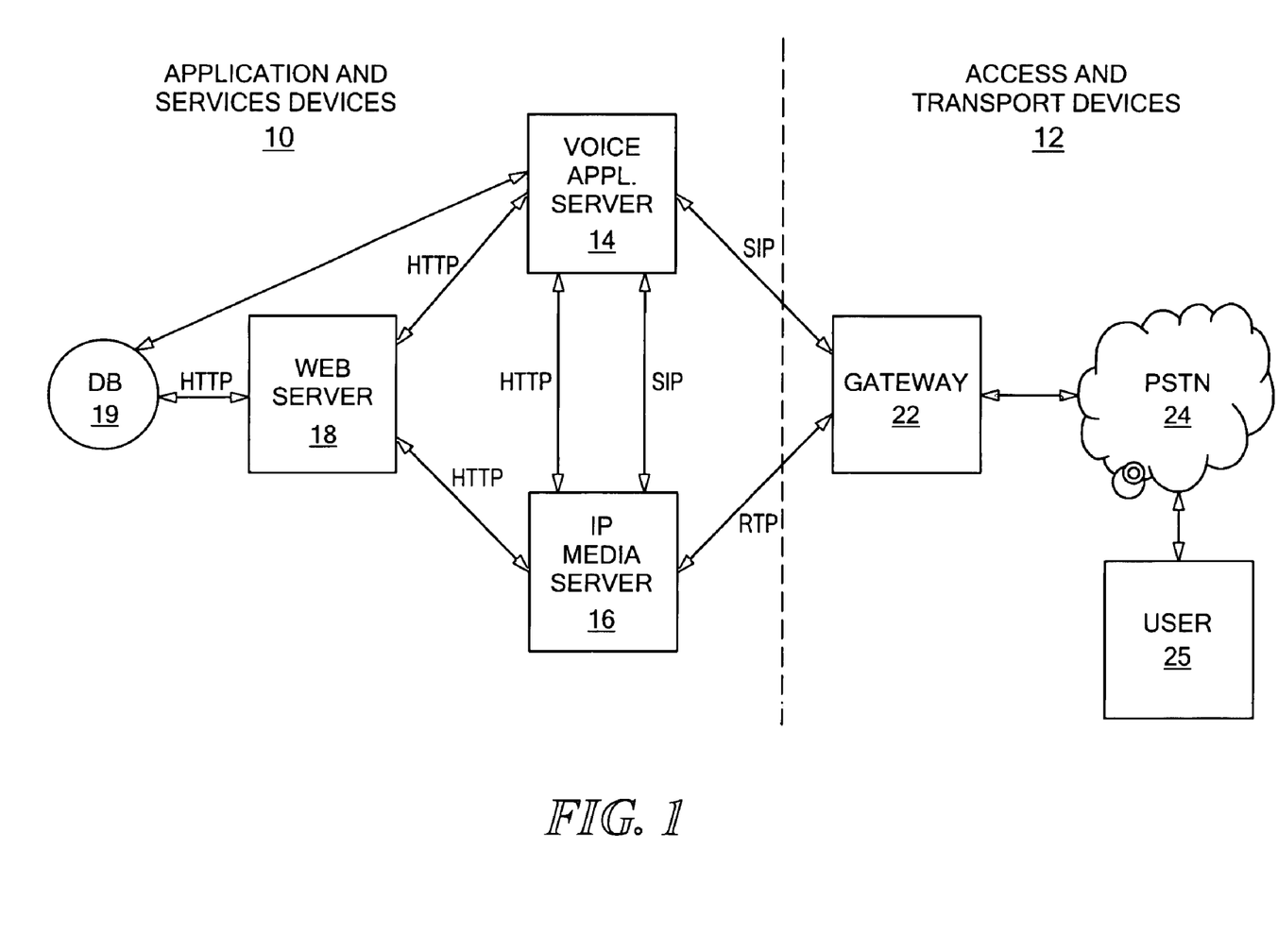
FIG. 1 shows an illustrative embodiment of the disclosed system in an operational environment including an integrated SIP (Session Initiation Protocol) gateway.

As shown in FIG. 1, application and services devices 10 are provided to support applications and services available to a user 25 through access and transport devices 12. The user 25 is, for example, a person placing a telephone call that is passed through the Public Switched Telephone Network (PSTN) 24 to the gateway 22, and then received for processing by the application and services devices 10. The gateway 22 may provide support for signaling using a variety of packet protocols. The application and services devices 10 may, for example, be physically located within a call center facility associated with one or more voice or telephone applications or services.

During operation, the gateway 22 exchanges signaling messages with the voice application server 14, using a compatible signaling protocol. In one embodiment, the signaling protocol used by the gateway 22 to communicate with the voice application server 14 is the Session Initiation Protocol (SIP). As it is generally known, SIP is an example of an IP (Internet Protocol) telephony signaling protocol that is suitable for integrated voice-data applications. In such an embodiment, the gateway 22 exchanges voice data with the IP media server 16 using a compatible transport protocol. For example, as shown in FIG. 1, the gateway 22 may use the Real-time Transport Protocol (RTP) to exchange voice data with the IP media server 16. RTP is an example of an IP protocol that supports real-time transmission of voice and video and that is widely used for IP telephony. Accordingly, the gateway 22 in FIG. 1 may be embodied as any gateway that converts TDM signaling to SIP signaling, and that exchanges voice data with the IP media server 16 in IP packets using RTP. One such existing gateway is the Cisco® AS5350.

Figure 2:
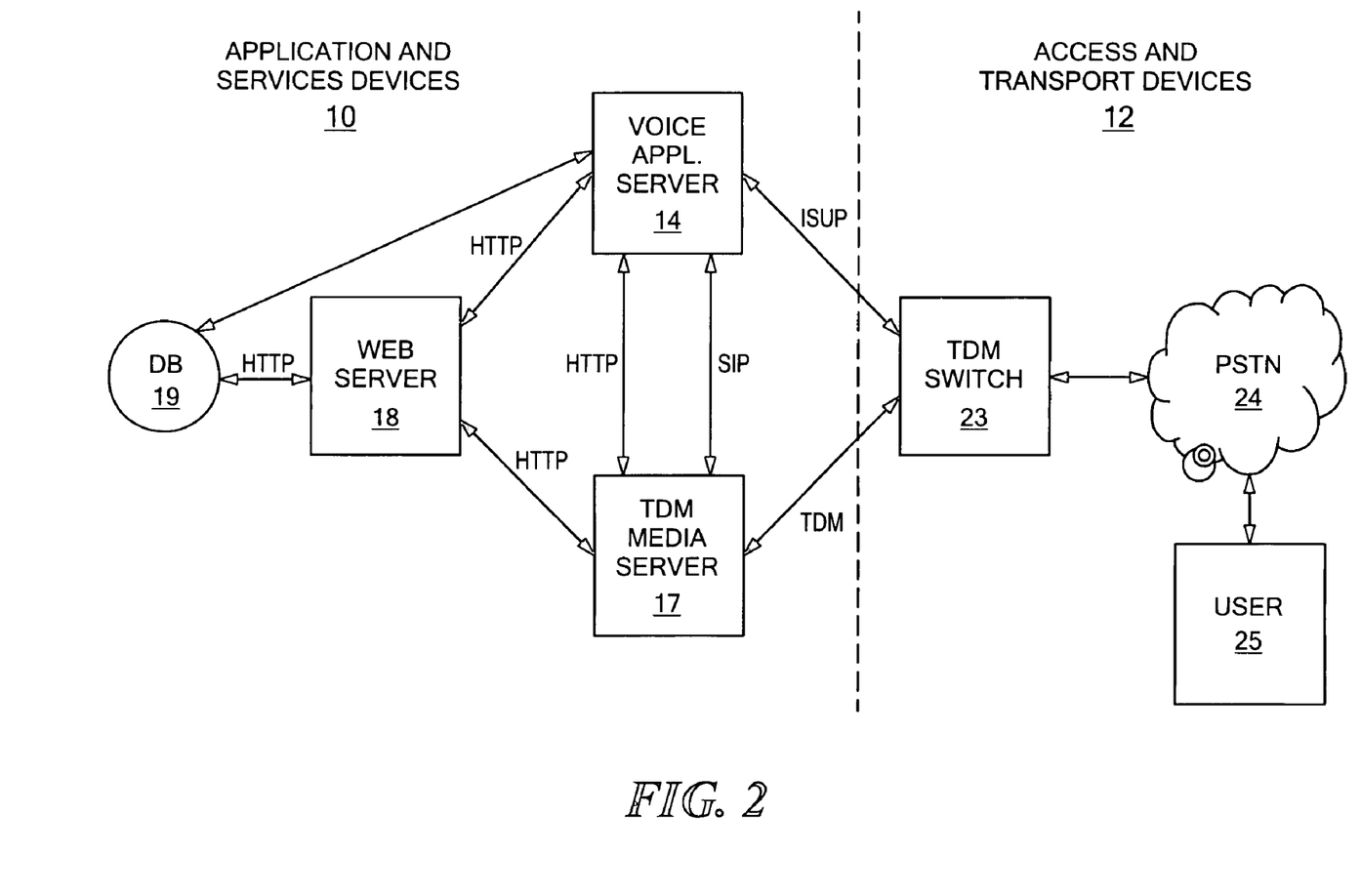
FIG. 2 shows an illustrative embodiment of the disclosed system operating in a TDM (Time Division Multiplexing) network.

In an alternative embodiment, shown in FIG. 2, a TDM switch 23 may be used as a gateway between the PSTN 24 and the application and services devices 10. In the embodiment of FIG. 2, the TDM switch 23 may employ the ISUP (ISDN User Part) signaling protocol when communicating with the voice application server 14, and employ TDM (Time Division Multiplexing) to exchange voice data with a TDM media server 17. While FIG. 2 shows signaling information being conveyed out of band between the TDM switch 23 and the TDM media server 17, signaling information could instead be sent in band between the TDM switch 23 and TDM media server 17, in which case the signaling information would be passed from the TDM media server 17 to the voice application server 14 using the SIP protocol.

Figure 3:
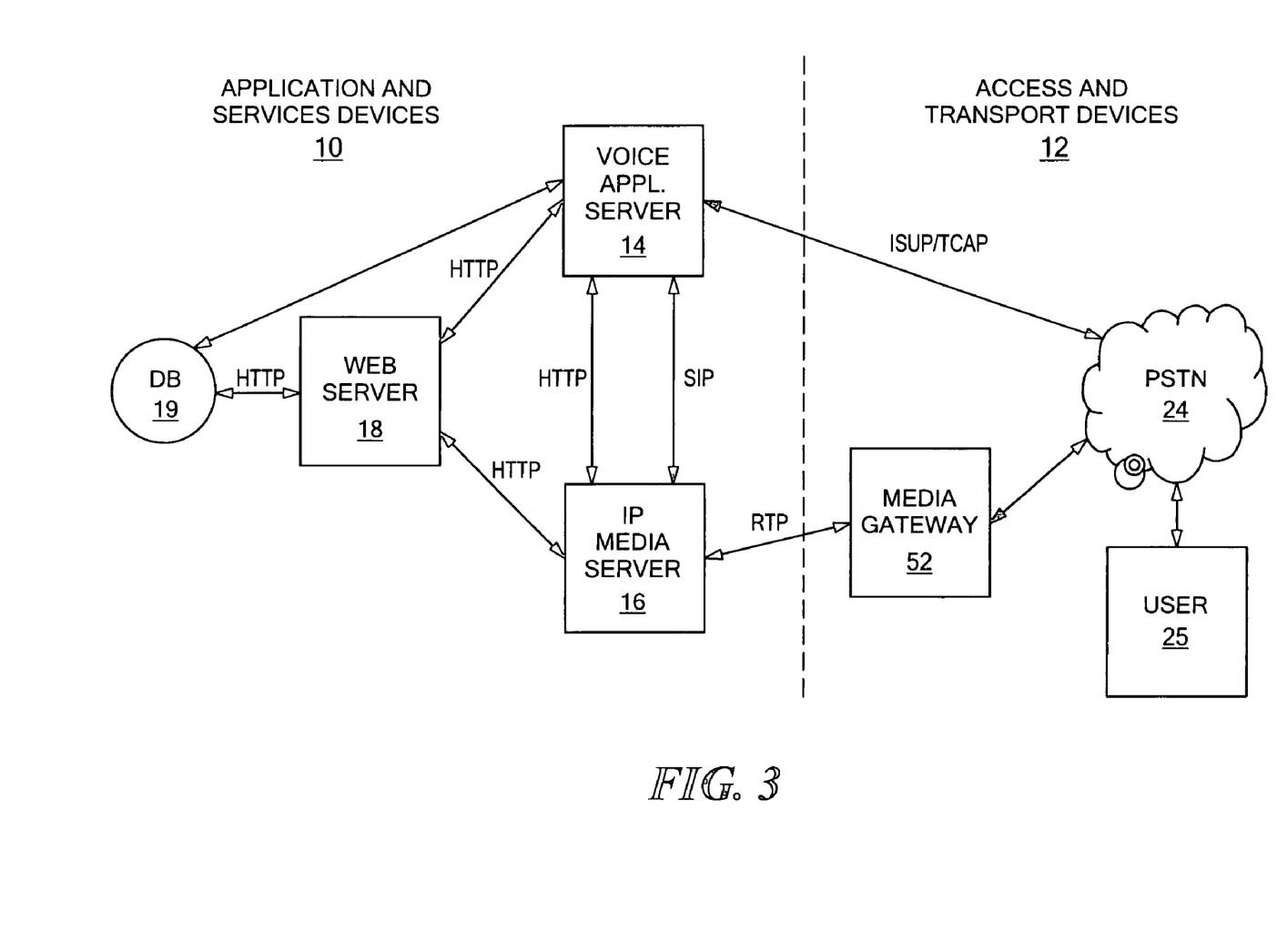
FIG. 3 shows an illustrative embodiment of the disclosed system in an operational environment using TDM signaling and an IP (Internet Protocol) media network.

FIG. 3 illustrates an embodiment in which a media gateway 52 converts the data bearer from the PSTN 24 to IP packets exchanged using RTP with the IP media server 16, and in which signaling information is accepted by the voice application server 14 directly from the PSTN 24. As shown in FIG. 3, the signaling information exchanged directly between the PSTN 24 and the voice application server 14 may consist of ISUP protocol and/or TCAP (Transaction Capabilities Application Part) protocol information.

Figure 4:
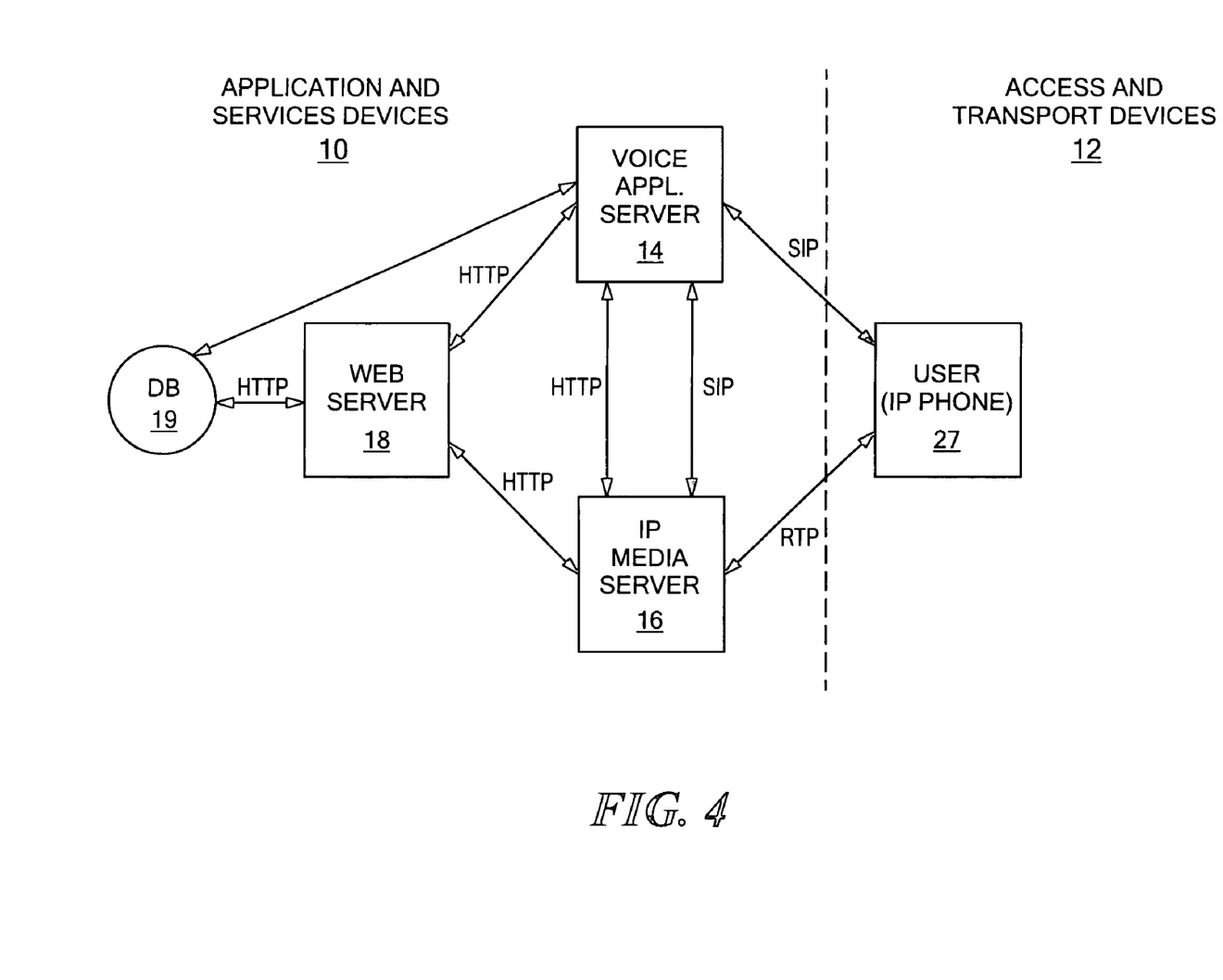
FIG. 4 shows an illustrative embodiment of the disclosed system in an operational environment including an IP telephone.

FIG. 4 shows an embodiment operating without a separate media gateway or TDM infrastructure within the access and transport devices 12. As shown in FIG. 4, an IP phone 27 may be used to exchange SIP signaling protocol information directly with the voice application server 14, and to exchange voice data with the IP media server 16 through the RTP protocol. Examples of technology that may serve as the IP telephone 27 shown in FIG. 4 include the PingTel® Xpressa™, or Microsoft Windows® NetMeeting software.

Figure 5:
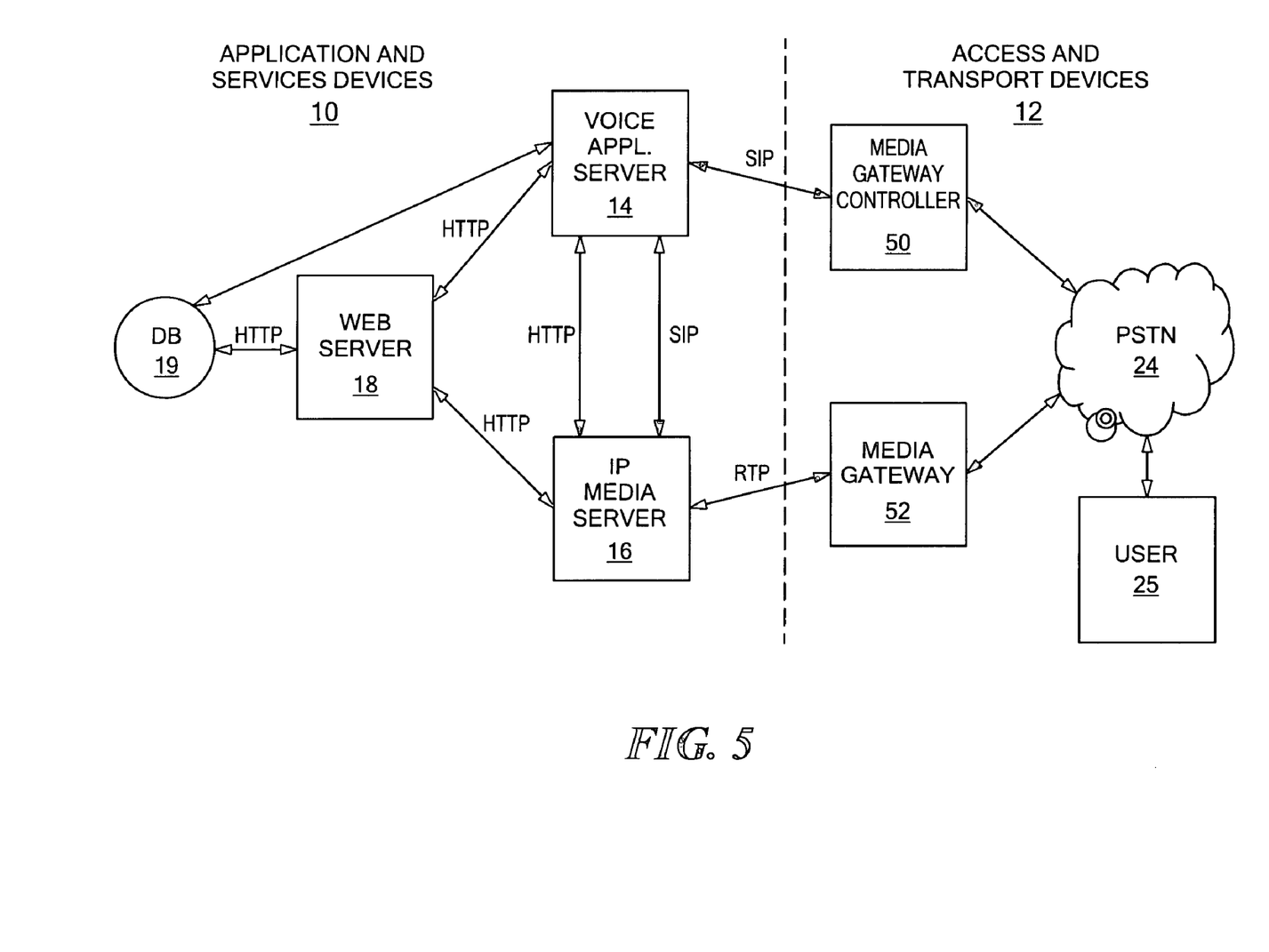
FIG. 5 shows an illustrative embodiment of the disclosed system in an operational environment including a distributed gateway within the access and transport devices.

FIG. 5 shows another exemplary embodiment in which of the disclosed system, in which the IP the media server 16 communicates with a media gateway 52 using the RTP protocol, and the voice application server 14 communicates with a media gateway controller 50 using SIP.

Now again with reference to FIG. 1, the voice application server 14 and IP media server 16 communicate using SIP and HTTP, and the IP media server 16 further communicates using HTTP with a web server 18, which in turn communicates with one or more database servers 19 using a predetermined database management protocol. Each of the voice application server 14, IP media server 16, web server 18, and/or database server 19 may, for example, be embodied as a physically separate computer system, including a number of processors, program memory, and input/output (I/O) devices. In such an embodiment, the voice application server 14, IP media server 16 and web server 18 would be interconnected using a communications network over which messages are exchanged using a predetermined message format and communications protocol. Alternatively, two or more of the voice application server 14, IP media server 16 and/or web server 18 may be embodied as independently executing software processes within a single computer system, logically separate from one another, for example using separate execution contexts and communicating using a predetermined inter-process communications protocol.

In the illustrative embodiment of FIG. 1, the voice application server 14 includes an environment for performing telephony signaling. For example, as it is generally known, telephony signaling includes exchanging control signals that establish and disconnect calls. Accordingly, the telephony signaling performed by the application server 14 in the illustrative embodiment includes establishing and disconnecting calls. The application server 14 may further include, in order to support one or more voice application programs executing on the application server 14, a number of voice related programming interfaces, such as TAPIs (Telephony Application Programming Interface), ISUP (ISDN User Part) APIs, JAIN™ APIs, and others. The application server 14 also provides a full execution environment for one or more procedural programming languages, such as Java™, Perl, C, C++, or other languages. Other components associated with voice application functionality may also be included in the voice application server 14, such as one or more Web application servers.

The primary function of the voice application server 14 is to support one or more voice enabled application programs. Such programs include service logic and specific instructions to provide voice-related services. One example of a service provided through the voice application server 14 is unified messaging, which provides access to both electronic mail and voice mail via a common interface to the user 25, for example by converting electronic mail messages to speech through text to speech processing.

Another example of a voice application service that may be provided through the voice application server 14 is Interactive Voice Response (IVR). As it is generally known, IVR systems may be used as front ends to call centers, in order to offload calls from relatively costly human agents, and advantageously eliminate the need for human agents to answer simple, repetitive questions.

The voice application server 14 may also or alternatively support a conferencing service, enabling interactive communication sessions between three or more geographically separated users via telephone connections. Conferencing services provided through the voice applications server 14 may include real-time audioconferencing, videoconferencing, and/or data conferencing.

One or more voice portals may also be supported through the voice application server 14, providing automated telephone information systems that speak to the caller with a combination of fixed voice menus and real-time data, potentially obtained from one or more databases in the database servers 19. In a typical interaction with a voice portal, the caller interacts with the system by pressing digits on the telephone, or by speaking words or short phrases that are recognized using voice recognition technology. Examples of currently available Voice Portal applications include banking, flight-scheduling, and automated order entry and tracking systems.

The above examples of services supported in the voice application server 14 are provided only as examples, and the voice application server 14 may be embodied including any appropriate application or service functionality.

Figure 6:
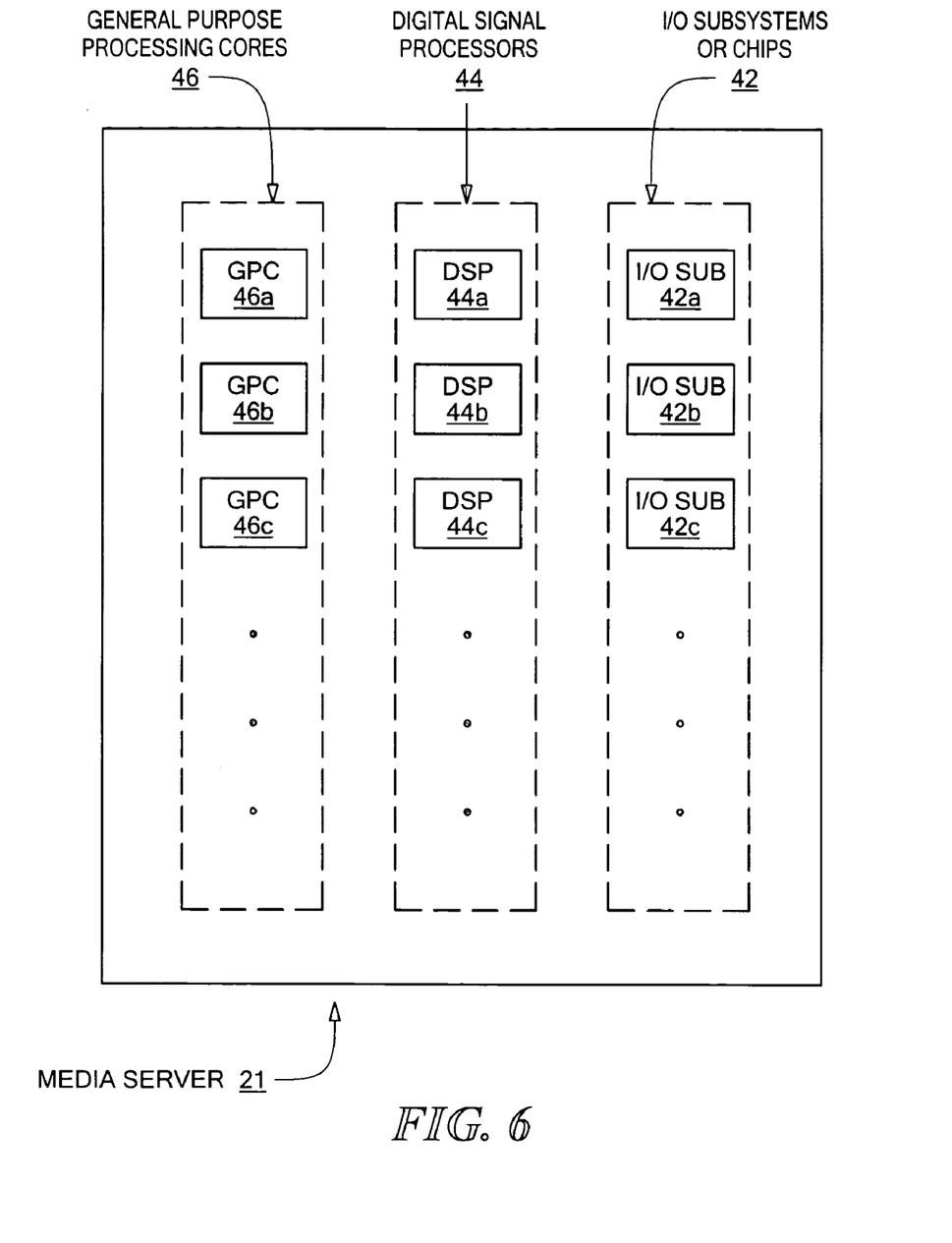
FIG. 6 shows an illustrative embodiment of the disclosed media server.

FIG. 6 shows an illustrative embodiment of the disclosed media server 21. The media server 21 is an optimized environment for execution of VoiceXML script, operating as a voice rendering platform to support the media requirements of applications executing on the voice applications server 14. The media server 21 provides voice-rendering related functionality such as speech recognition, digit signaling (e.g. DTMF), audio playback, and text to speech conversion. As shown in FIG. 6, the media server 21 may include a number of I/O subsystems or chips 42, shown as I/O subsystem 42a, I/O subsystem 42b, etc. The I/O subsystems 42 within the media server 16 may, for example, be network processors for processing IP packets, such as the Intel® IXP 1200 chip. The media server 21 further is shown including a number of DSPs (Digital Signal Processors) 44, shown as DSP 44a, DSP 44b, etc. The DSPs 44 used in the media server 16 may, for example, include the TMS320C5441™ platform developed and distributed by Texas Instruments Incorporated. While the media server 21 of FIG. 6 is shown including a number of dedicated DSPs 44, the DSPs 44 are shown for purposes of illustration only.

An alternative embodiment of the media server 21 may implement one or more signal processing algorithms on one or more general purpose processing cores 46, shown as GPC 46a, GPC 46b, etc in FIG. 6. The general purpose processing cores 46 in the media server 16 may, for example, include one or more IBM® PowerPC®. During operation, the SIP and HTTP protocols are handled in the media server 16 by software executing in both the general purpose processing cores 46 and the DSPs 42, each of which may have its own memory and stored programs. VoiceXML script is processed in the media server 16, for example, using the general purpose processing cores 46.

Figure 7:
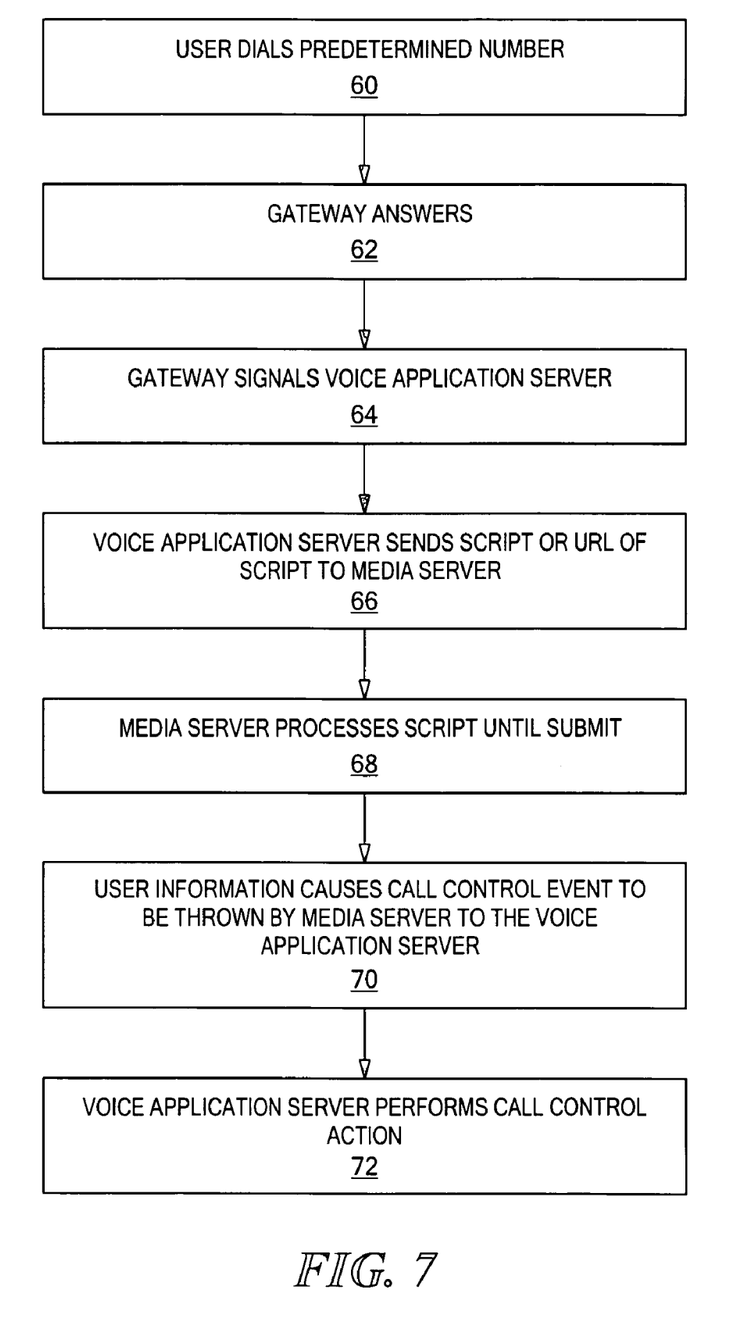
FIG. 7 is a flow chart showing operation of an illustrative embodiment of the disclosed system.

FIG. 7 is a flow chart showing steps performed during operation of the illustrative embodiment of the disclosed system. At step 60 of FIG. 7, a user such as the user 25 shown in FIG. 1, initiates a telephone call, for example by dialing a predetermined telephone number. At step 62, a gateway system coupled to the telephone network, such as the gateway 22 shown in FIG. 1, answers the phone call. The answering gateway system then signals a voice application server at step 64, such as the voice application server 14 shown in FIG. 1, and the voice application server 14 recognizes the predetermined telephone number indicated by the signaling messages transmitted from the gateway 22.

At step 66, the voice application server 14 signaled by the answering gateway 22 maps the predetermined telephone number dialed by the user 25 and indicated by the answering gateway 22 to at least one VoiceXML script. The voice application server 14 further operates at step 66 to inform a media server, such as the media server 16 shown in FIG. 1, of the phone call. The voice application server also either provides the VoiceXML script itself, or an address of the VoiceXML script, such as a URL, to the media server 16.

The media server 16 then operates at step 68 to process the VoiceXML script identified by the voice application server 14. For example, the VoiceXML script may provide a voice dialog form to be filled out by the user 25 through voice or other responses. After the user has provided all information required by the script, a <submit> VoiceXML command is processed to convey the information collected using the VoiceXML script to one or more applications on the voice application server 14. In response to the information collected by the media server 16 from the user, at step 70, the media server 16 indicates to the voice application server 14 that a call control operation is to be performed by virtue of the receipt of the HTTP command used to honor the <submit>, i.e., HTTP POST or HTTP GET.

Alternatively, the media server 16 may still interpret the <transfer> tag and send an indication to the application server. This indication may be performed, for example, by the media server 16 throwing an event to the voice application server 14, indicating the specific call control action to be performed. While various call control events may be indicated, an example of a call control event to be performed by the voice application server 14 might be connecting the user 25 to a remote call center (not shown), where a call center operator would answer. Such a call control event is then performed in the voice application server 14 at step 72. In the case of a connection to a remote call center, the voice application server would operate to place a call to the remote call center, and then when that outbound call was answered at the remote call center, connecting the original user call to the remote call center.

Figure 8:
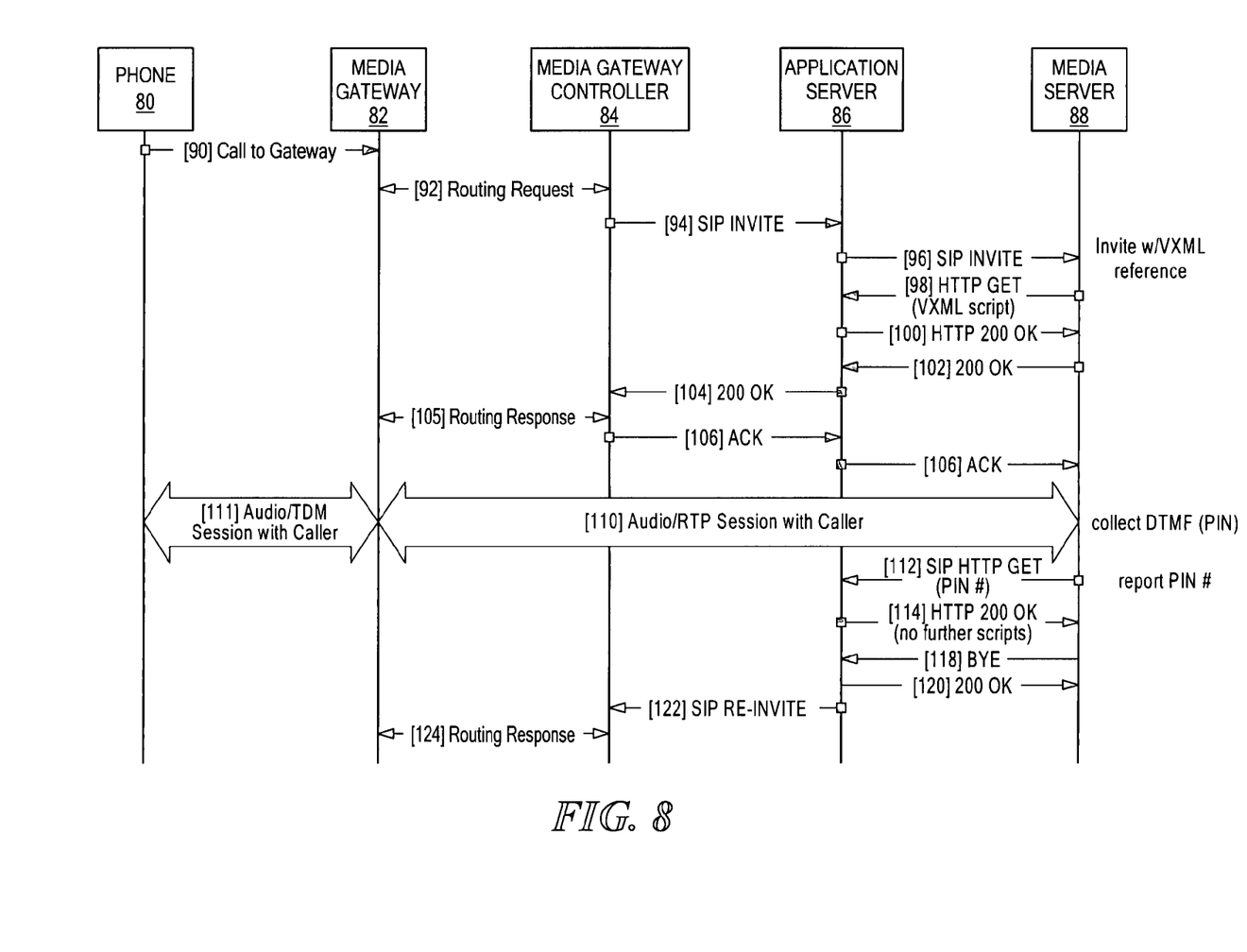
FIG. 8 further illustrates operation of an illustrative embodiment of the disclosed system.

FIG. 8 further illustrates operation of an exemplary embodiment of the disclosed system. For purposes of explanation, the media gateway 82 of FIG. 8 corresponds to the media gateway 52 of FIG. 5, the media gateway controller 84 of FIG. 8 corresponds to the media gateway controller 50 of FIG. 5, the application server 86 corresponds to the voice application server 14 of FIG. 5, and the media server 88 of FIG. 8 corresponds to the IP media server 16 of FIG. 5.

As shown in FIG. 8, a user places a call 90 using the telephone 80 by dialing a number that is routed to the media gateway 82 by the telephone network. The media gateway 82 responds by issuing a routing request 92 to the media gateway controller 84. In response to the routing request 92, the media gateway controller determines the call is for an application, and sends a SIP INVITE 94 to the application server 86. The application server 86 then sends a SIP INVITE 96 to the media server 88, which includes a reference to a VoiceXML script to execute. As a result of the INVITE, the media server 88 sends the HTTP GET command 98 back to the application server 86, in order to obtain the VoiceXML script that is to be executed in processing the call. The application server 86 then sends the requested script back to the media server 88 in the HTTP 200 OK message 100. While in FIG. 8, for purposes of illustration, the media server 88 obtains the VoiceXML script from the application server 88, the media server 88 may alternatively fetch the VoiceXML script from any web server as appropriate for a given deployment of the disclosed system.

Now the media server has the VoiceXML script, it is ready to accept the call. At step 102, the media server 88 issues a 200 OK SIP command to signal the application server 86 that it is ready to accept the call. The application server signals the media gateway controller 84 that it is ready to accept the call by issuing the SIP 200 OK message 104. The media gateway controller 84 requests the media gateway 82 to create a connection with the media server 88 in the routing response 105.

At this point, the connection is ready, so the media gateway controller 84 acknowledges the connection to the application server 86 in the SIP ACK message 106. The application server 86 acknowledges the connection to the media server 88 in the SIP ACK message 108. This establishes the path 110 between the media server 88 and the media gateway 82. The media gateway 82 relays the audio from the caller to the media server 88 through the PSTN connection 111.

During the voice dialog over the path 110 and connection 111, the media server 88 executes the script it received from the application server 86, and collects information provided by the user, for example in DTMF form. In an embodiment that is supporting a prepaid calling card application, in which the caller is attempting to make a long distance phone call through use of a prepaid calling card, the information collected might include the card number and the number to be dialed. Alternatively, in an embodiment in which the caller is attempting to place an outbound call from an office, where all outbound calls must be associated with a client identifier, the information collected might include the identity of the caller, for example in the form of a Personal Identification Number (PIN), and a client identifier for the call. These two applications are given only for purposes of explanation, and the present invention is not limited to these applications, and may be embodied for any suitable voice application.

Following the Audio/RTP session 110, the media server 88 passes the information it obtained from the caller during the Audio/RTP session 110 to the application server 86 in the HTTP GET command 112. For example, the information provided to the application server 86 may include a PIN associated with the caller. The application server 86 may then perform various checks with regard to the information provided from the media server 88. Such checks may include whether or not a prepaid card has sufficient remaining prepaid time to make the requested call, or whether the caller is permitted to associate the call with the provided client code, and/or other types of checks. The application server 86 may also provide additional scripts to the media server 88, for example indicating a failed request by the caller due to lack of authorization, or in order to obtain further information from the caller.

After all of the necessary scripts for the application have been provided by the application server 86 and processed by the media server 88, the application server 86 knows, from the service logic running on the application server, that a transfer call control action must be performed, for example to connect the caller with the requested long distance number, or to establish the call that is associated with the provided client code.

Alternatively, the media server 88 may detect a <transfer> tag in a script that it processes. The information passed from the media server 88 to the application server 86 indicates that the call transfer is to be performed, and any other details of the transfer, such as the new destination number.

At step 122, the original call is redirected by a SIP re-INVITE command passed from the application server 86 to the media gateway controller 84. For example, in the case of a prepaid calling card application, the SIP re-INVITE 122 may operate to connect the caller to the requested long distance number. Similarly, in the case of the client code entry system, the SIP re-INVITE 122 may also operate to connect the caller to the requested number in the event the caller was determined authorized to make the call.

Upon receiving an empty HTTP 200 OK message 114 from the application server 86, the media server 88 knows there will not be any more interaction with the caller. The media server 88 thus sends a SIP BYE message 118 to the application server 86. The media server 88 must send the SIP BYE message 118 to the application server 86, since the application server 86 may not have been the entity providing any or all of the VoiceXML scripts to the media server 88. Regardless of the source of a VoiceXML script provided to the media server 88, if processing of that VoiceXML script may result in or be followed by a transfer call control action, then that script indicates that indication of and/or information relating to the transfer call control action should be passed from the media server 88 to the application server 86 for performance of the transfer call control action.

The application server 86 acknowledges the BYE message 118 with the SIP 200 OK response 120. The application server 86 then reroutes the call, per application logic within the application server 86. To reroute the call, the application server 86 re-INVITEs the caller to the target destination by issuing a SIP re-INVITE message 122 to the media gateway controller 84. The media gateway controller 84 then directs the media gateway 82 to redirect the stream to the appropriate endpoint. The rest of the call flow for the redirection of the call is similar to steps 104–106 of FIG. 8.

Figure 9:
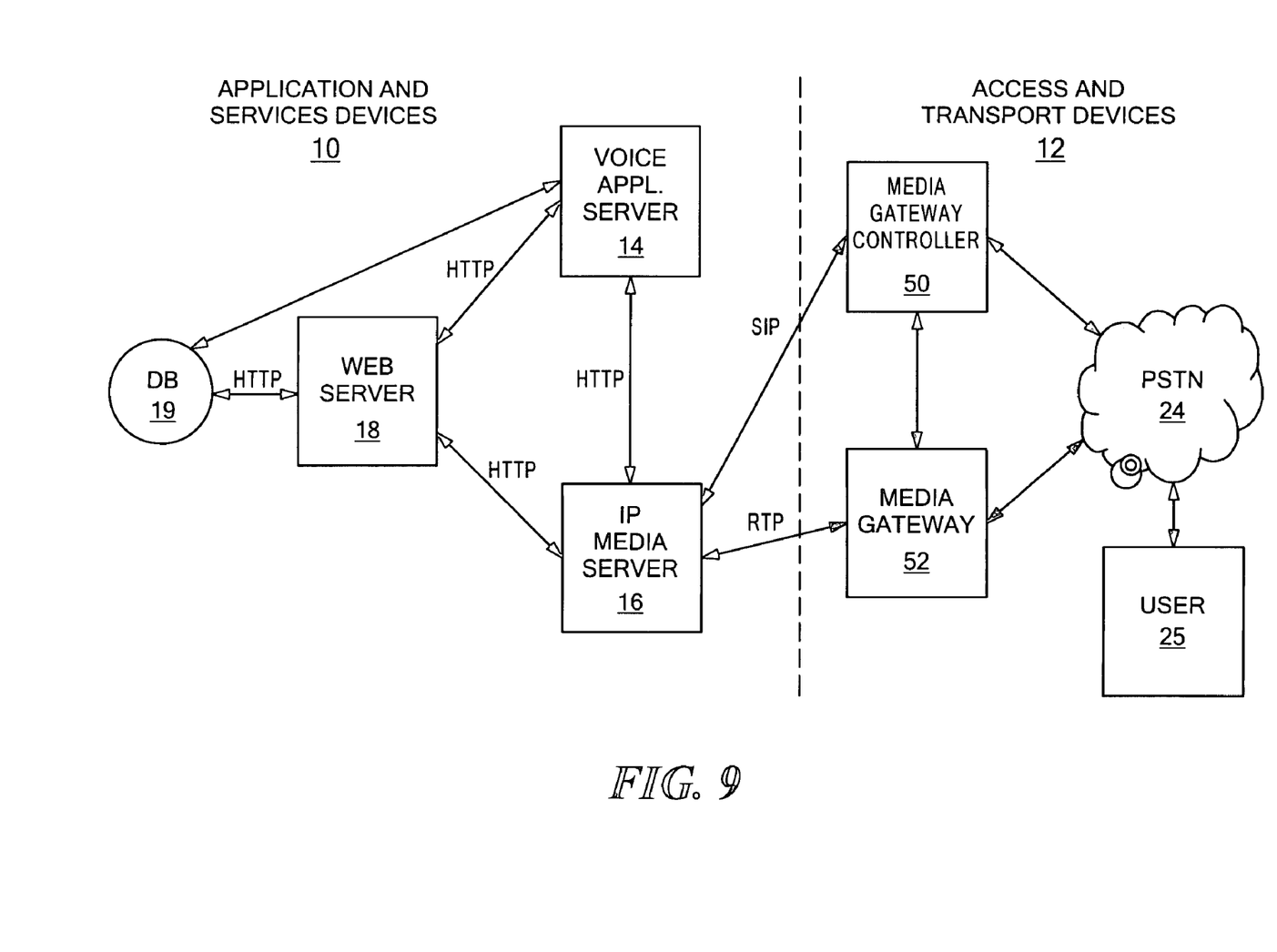
FIG. 9 shows an illustrative embodiment of the disclosed system supporting automatic launching of VoiceXML scripts.

FIG. 9 shows an embodiment of the disclosed system operable to support automatic launching of VoiceXML scripts. In some situations, a voice application server may not be capable of supporting a telecommunications protocol, for example SIP, that is necessary for performing call control actions. In such a case, the voice application server may nonetheless provide VoiceXML scripts to the media server for rendering during a user dialog. The devices shown in FIG. 9 correspond to the devices shown in FIG. 5, with the exception that the media gateway controller 50 exchanges SIP messages with the IP media server 16, rather than with the voice application server 14.

In the embodiment shown in FIG. 9, the IP media server further includes software providing a VoiceXML launcher, which enables HTTP-based VoiceXML application servers to deliver services to SIP user agents without requiring the application servers to implement the SIP protocol. The VoiceXML launcher software effectively operates to turn incoming SIP calls into HTTP requests that a VoiceXML application server can accept. During operation, the VoiceXML launcher software operates as follows:

1. When the IP media server 16 receives a SIP INVITE that is not directed to a well-known media service (e.g. announcement, interactive voice response, conferencing, or VoiceXML dialog), the SIP INVITE is directed to a default service rather than being rejected. When VoiceXML launcher capability is desired, the default service is defined to be the VoiceXML dialog service.

2. The SIP INVITE is sent to the dialog service for processing. Normally, in the case of dialog service, there is exactly one URI parameter which identifies the script to be executed ("voicexml="). However, in this case no parameter is sent in the SIP INVITE. The VoiceXML launcher software uses a pre-provisioned script to contact the VoiceXML application server 14 and to pass session variables (caller, callee, diversion, time of day, etc.) to the VoiceXML application server 14.

3. The VoiceXML application server 14 then generates the appropriate script based on the session variables provided by the IP media server 16, and returns the next script in the HTTP response to the IP media server 16.

The operation of the devices shown in FIG. 9 is now further described with reference to the steps shown in FIG. 10. For purposes of illustration, the media gateway 132 of FIG. 10 corresponds to the media gateway controller 52 of FIG. 9, the media gateway controller 134 of FIG. 10 corresponds to the media gateway controller 50 of FIG. 9, the media server 136 of FIG. 10 corresponds to the IP media server 16 of FIG. 9, and the VoiceXML application server 138 corresponds to the voice application server 14 shown in FIG. 9. For exemplary purposes SS7 signaling is used from the PSTN. Alternatively, any suitable signaling can be used.

Figure 10:
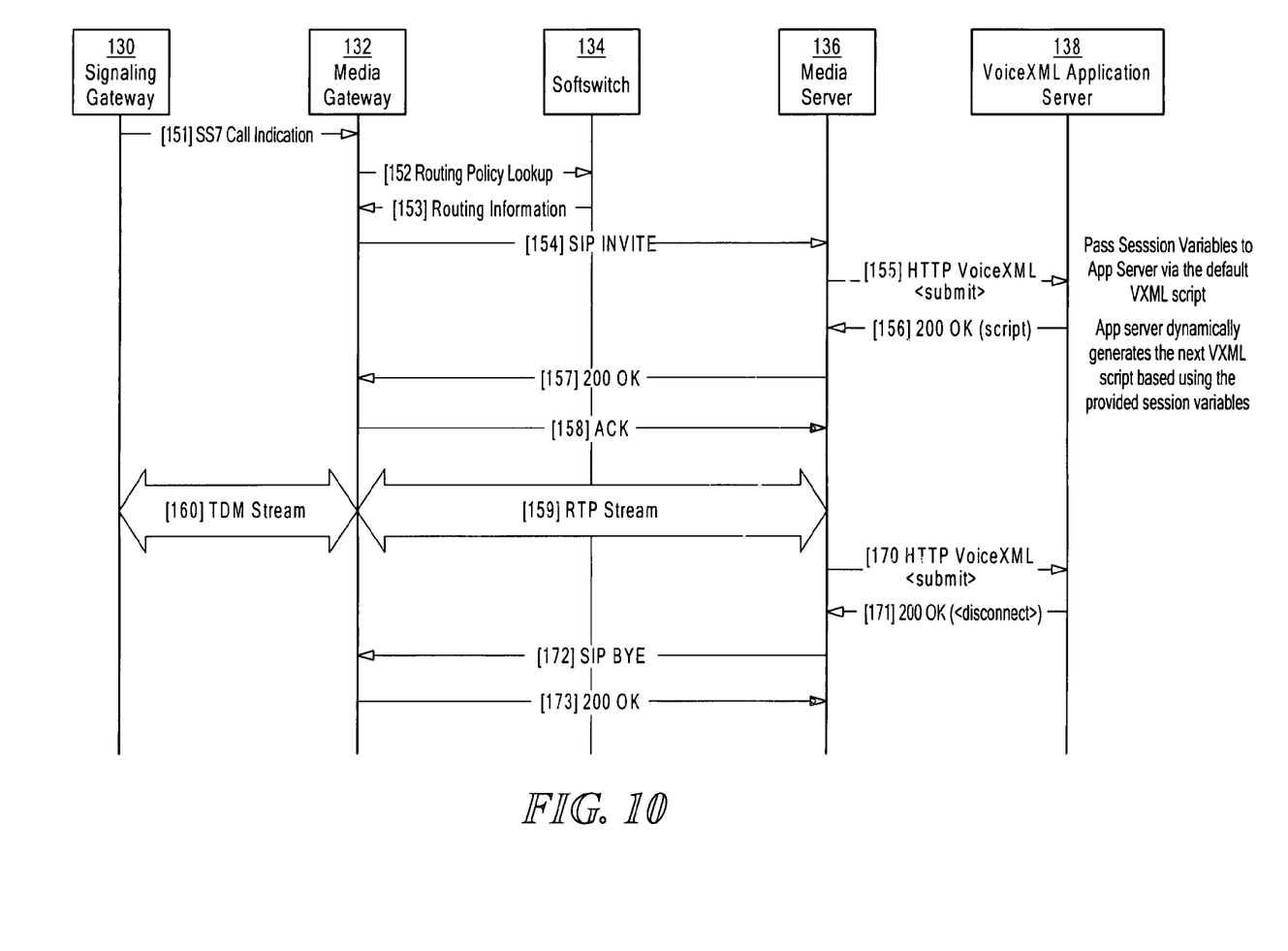
FIG. 10 further illustrates the operation of the embodiment shown in FIG. 9.

At step 151 of FIG. 10, a signaling gateway 130 sends an SS7 incoming call indication to the media gateway 132. When the media gateway 132 receives the SS7 call indication, the media gateway 132 makes a routing policy request 152 to the media gateway controller 134 at step 152, in order to determine the SIP URL to which the call should be directed. At step 153, the media gateway controller 134 returns a SIP URL to the media gateway 132 so that the media gateway 132 can direct the call to the appropriate SIP user agent. In the example of FIG. 10, the SIP URL is associated with the media server 136.

The media gateway 132 uses the returned SIP URL to form a SIP INVITE message to the media server 136 at step 154. The "To" header in the SIP INVITE sent at step 154 corresponds to the called number and the "From" header corresponds to the calling number. The media server 136 is configured so that the dialog service ("VoiceXML Launcher") is the default service. This service takes information from the SIP INVITE and uses it to populate a VoiceXML script template that has been associated with the launcher service and processes it as the initial script. In some circumstances, and for purposes of explanation, the script consists simply of a <submit> tag and a namelist which includes the called party and calling party information.

Other information regarding the call may additionally or alternatively be provide, such as the current time of day. The <submit> tag includes the HTTP URL of the VoiceXML application server to be contacted. The namelist variable names could be those of the VoiceXML session variables or others which are agreed upon. The <submit> tag causes these variables to be communicated to the specified VoiceXML application server 138 via HTTP at step 155.

The VoiceXML application server 138 receives the called and calling numbers and uses this information to select or generate an appropriate VoiceXML script for the session. The script is returned to the media server for processing in the body of the HTTP response 156.

Now that the media server 136 has retrieved the first VoiceXML script containing user interactions, at step 157 it sends a positive SIP 200 OK response to the SIP INVITE from the media gateway. The media gateway 132 acknowledges the final response from the media server 136 and the end to end RTP stream is established 159 in connection with the TDM stream 160. The media server 136 processes the VoiceXML script to interact with the user and collect data as specified. The media server 136 uploads the collected information to the VoiceXML Application Server using the HTTP POST in response to the VoiceXML <submit> tag 170.

The VoiceXML application server then processes the namelist from the received HTTP message 170 in order to determine or generate the next VoiceXML script. In the example of FIG. 10, the script consists of a <disconnect> tag which will end the session, shown conveyed to the media server 136 at step 171. The media server 136 interprets the <disconnect> tag in the script and generates a SIP BYE request 172 to terminate the session with the media gateway 132. The media gateway 132 sends a 200 OK response at step 173 to the BYE request, thereby ending the session.

FIGS. 7, 8 and 10 are illustrative of methods of operation of the presently disclosed system. It will be understood that each block of the flowchart illustration, and combinations of blocks in the flowchart illustration, can be implemented by computer program instructions. These computer program instructions may be loaded onto a computer or other programmable data processing apparatus to provide the functionality herein described.

Those skilled in the art should readily appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the above described methods and system may be made without departing from the inventive concepts herein disclosed. Accordingly, the invention should not be viewed as limited except by the scope and spirit of the appended claims.

What is claimed is:

1. A method for providing voice communications over a network, comprising:
   receiving, at a first server system, a first call signaling message, said first call signaling message requesting that a voice communications session be established;
   determining, at said first server system, whether said first call signaling message indicates a service to be provided;
   in the event that said first call signaling message does not indicate a service to be provided, processing, at said first server system, a default script in a predetermined mark up language;
   forming, at said first server system, responsive to said processing of said default script and at least one call parameter of said first call signaling message, a second message including said at least one call parameter of said first call signaling message;
   transmitting, from said first server system to a second server system separate from said first server system, said second message;
   receiving a new script from said second server system; and
   processing said new script from said second server system at said first server system.

2. The method of claim 1, further comprising:
   determining, by said second server system, responsive to said at least one call parameter included in said second message, said new script; and
   transmitting said new script in a third message to said first server system.

3. The method of claim 1, wherein said first call signaling message is a session initiation protocol (SIP) INVITE message, wherein said second message is a hypertext transport protocol (HTTP) message, and wherein said predetermined mark up language is VoiceXML.

4. The method of claim 1, wherein said at least one call parameter comprises a telephone number associated with a caller.

5. The method of claim 1, wherein said at least one call parameter comprises a destination telephone number.

6. The method of claim 1, wherein said at least one call parameter comprises a time of day the call was placed.

7. A system for providing voice communications over a network, comprising:
   a first server system including at least one processor communicably coupled to a program memory, said first server system operable to
   receive a first call signaling message, said first call signaling message requesting that a voice communications session be established,
   determine whether said first call signaling message indicates a service to be provided,
   in the event that said first call signaling message does not indicate a service to be provided, process a default script in a predetermined mark up language,
   form, responsive to said processing of said default script and at least one call parameter of said first call signaling message, a second message including said at least one call parameter of said first call signaling message,
   transmit said second message to a second server system,
   receive a new script from said second server system, and
   process said new script from said second server system.

8. The system of claim 7, further comprising:
   a second server system including at least one processor communicably coupled to a program memory, wherein said second server system is operable to
   determine, responsive to said at least one call parameter included in said second message, said new script; and
   transmit said new script in a third message to said first server system.

9. The system of claim 7, wherein said first call signaling message is a session initiation protocol (SIP) INVITE message, wherein said second message is a hypertext transport protocol (HTTP) message, and wherein said predetermined mark up language is VoiceXML.

10. The system of claim 7, wherein said at least one call parameter comprises a telephone number associated with a caller.

11. The system of claim 7, wherein said at least one call parameter comprises a destination telephone number.

12. The system of claim 7, wherein said at least one call parameter comprises a time of day the call was placed.

13. A method for providing voice communications over a network, comprising:
   receiving a call initiation signaling message that includes at least one parameter;
   determining whether the call initiation signaling message indicates a service to be provided;
   responsive to receiving the call initiation signaling message, if the call initiation signaling message does not indicate a service to be provided, executing a first script written in a predetermined mark-up language, the first script calculating an address of a second script, written in the predetermined mark-up language, based on at least a portion of the at least one parameter; and
   invoking the second script.

14. The method of claim 13, wherein receiving the call initiation signaling message comprises receiving at least one parameter selected from a list comprising a calling party number, a called party number, a call diversion reason and a time of day at which a call was placed.

15. The method of claim 13, wherein invoking the second script comprises passing at least a portion of the at least one parameter.

16. The method of claim 15, further comprising generating a third script, written in the predetermined mark-up language, based on the passed at least a portion of the at least one parameter.

17. The method of claim 16, further comprising returning the generated third script.

18. The method of claim 13, wherein executing the first script comprises calculating a uniform resource identifier (URI) of the second script.

19. The method of claim 13, wherein:
   receiving the call initiation signaling message comprises receiving a session initiation protocol (SIP) INVITE message; and
   invoking the second script comprises sending a hypertext transport protocol (HTTP) message.

20. The method of claim 19, wherein the predetermined mark-up language is VoiceXML.

21. The method of claim 13, wherein receiving the call initiation signaling message comprises receiving an SS7 incoming call indication.

22. The method of claim 13, wherein:
receiving the call initiation signaling message comprises receiving the call initiation signaling message on a first server; and further comprising:
executing the second script on a second server that is separate from the first server.

23. The method of claim 22, further comprising generating, on the second server, a third script, written in the predetermined mark-up language, based on at least a portion of the passed at least a portion of the at least one parameter.

24. The method of claim 23, further comprising returning the generated third script to the first server.

25. The method of claim 24, further comprising executing the third script on the first server.

* * * * *